United States Patent
Mody et al.

(10) Patent No.: US 10,567,024 B2
(45) Date of Patent: Feb. 18, 2020

(54) ELECTRONIC DEVICE CASE WITH SEALED LIQUID-CONTAINING CHAMBER AND HETEROGENEOUS LIQUID MIXTURE DISPLAY

(71) Applicant: CASE-MATE, INC., Atlanta, GA (US)

(72) Inventors: Saumil Chetan Mody, Atlanta, GA (US); Nitin Koshy Philip, Sandy Springs, GA (US)

(73) Assignee: CASE-MATE, INC., Atlanta, GA (US)

( * ) Notice: Subject to any disclaimer, the term of this patent is extended or adjusted under 35 U.S.C. 154(b) by 0 days.

(21) Appl. No.: 15/997,456

(22) Filed: Jun. 4, 2018

(65) Prior Publication Data

US 2019/0013832 A1    Jan. 10, 2019

Related U.S. Application Data

(60) Provisional application No. 62/678,217, filed on May 30, 2018, provisional application No. 62/568,050, filed on Oct. 4, 2017, provisional application No. 62/530,373, filed on Jul. 10, 2017.

(51) Int. Cl.
*H04B 1/3888* (2015.01)
*H04M 1/02* (2006.01)

(52) U.S. Cl.
CPC ........ *H04B 1/3888* (2013.01); *H04M 1/0202* (2013.01)

(58) Field of Classification Search
CPC .. H04B 1/3888; H04M 1/0283; H04M 1/185; H04M 1/0202; G06F 1/1656; A45C 2011/002
See application file for complete search history.

(56) References Cited

U.S. PATENT DOCUMENTS

| | | | |
|---|---|---|---|
| 2,361,423 A | | 10/1944 | Snyder |
| 5,175,873 A | | 12/1992 | Goldenberg et al. |
| 5,520,775 A | * | 5/1996 | Fischl ............ B29C 65/08 156/580.1 |
| 6,471,056 B1 | | 10/2002 | Tzeng |
| 6,792,709 B1 | | 9/2004 | Fine et al. |
| 7,158,376 B2 | | 1/2007 | Richardson et al. |

(Continued)

FOREIGN PATENT DOCUMENTS

CN     201985941 U     9/2011

OTHER PUBLICATIONS

International Search Report and Written Opinion for PCT/US2013/020749; dated Apr. 5, 2013; 9 pgs.

(Continued)

*Primary Examiner* — Brandon J Miller
(74) *Attorney, Agent, or Firm* — Gardner Groff & Greenwald, PC

(57) ABSTRACT

A case or cover for en electronic device, the case having at least one hermetically sealed liquid filled chamber with an ultrasonically welded joint on the inside of the back shell of the case, and a method for manufacturing such a case or cover, and for forming a hermetically sealed liquid filled chamber in or on a case or cover with improved sealing characteristics and leak resistance. Multi-colored liquids suspended in an immiscible solution may be contained in the chamber(s) to generate color overlaid patterns visible through the back of the case.

5 Claims, 19 Drawing Sheets

(56) References Cited

U.S. PATENT DOCUMENTS

| | | | |
|---|---|---|---|
| D582,149 S | 12/2008 | Tan | |
| 7,555,325 B2 | 6/2009 | Goros | |
| D600,908 S | 9/2009 | Richardson et al. | |
| 7,594,576 B2 | 9/2009 | Chen et al. | |
| 7,609,512 B2 | 10/2009 | Richardson et al. | |
| D613,282 S | 4/2010 | Richardson et al. | |
| D615,535 S | 5/2010 | Richardson et al. | |
| D615,536 S | 5/2010 | Richardson et al. | |
| D617,784 S | 6/2010 | Richardson et al. | |
| D617,785 S | 6/2010 | Richardson et al. | |
| D619,574 S | 7/2010 | Richardson et al. | |
| D634,741 S | 3/2011 | Richardson et al. | |
| D636,386 S | 4/2011 | Richardson et al. | |
| 7,933,122 B2 | 4/2011 | Richardson et al. | |
| D638,005 S | 5/2011 | Richardson et al. | |
| D641,013 S | 7/2011 | Richardson et al. | |
| D642,170 S | 7/2011 | Johnson et al. | |
| 8,051,980 B2 | 11/2011 | Tai et al. | |
| D651,203 S | 12/2011 | Michie et al. | |
| 8,204,561 B2 | 6/2012 | Mongan et al. | |
| 8,245,842 B2 | 8/2012 | Bau | |
| 8,320,597 B2 | 11/2012 | Griffin, Jr. et al. | |
| 8,430,240 B2 | 4/2013 | Kim | |
| 8,453,835 B2 | 6/2013 | So | |
| 8,695,798 B2 | 4/2014 | Simmer | |
| 8,777,002 B2 | 7/2014 | Lonsdale, II et al. | |
| D723,531 S | 3/2015 | Katzke | |
| D773,448 S | 12/2016 | Armillotti | |
| 2003/0002876 A1 | 1/2003 | Baron | |
| 2003/0223947 A1* | 12/2003 | Alvarez | A61K 8/03 424/70.12 |
| 2004/0128876 A1* | 7/2004 | Cheek | B65D 33/00 40/124.12 |
| 2006/0172765 A1* | 8/2006 | Lev | H04B 1/3888 455/550.1 |
| 2010/0048267 A1 | 2/2010 | Lin | |
| 2010/0270189 A1 | 10/2010 | Pedersen, II et al. | |
| 2011/0183790 A1* | 7/2011 | Chernick | A63B 39/08 473/604 |
| 2011/0192510 A1* | 8/2011 | Bau | G06F 1/1626 150/154 |
| 2011/0192743 A1 | 8/2011 | May et al. | |
| 2012/0031914 A1 | 2/2012 | Liu | |
| 2012/0055826 A1 | 3/2012 | Nishimura | |
| 2012/0103844 A1 | 5/2012 | Piedra et al. | |
| 2012/0305422 A1 | 12/2012 | Vandiver | |
| 2013/0034836 A1* | 2/2013 | Marshall | G09B 5/062 434/236 |
| 2014/0224675 A1 | 8/2014 | Simmer | |
| 2015/0141090 A1* | 5/2015 | Hwan | H04B 1/3888 455/575.8 |
| 2016/0013821 A1* | 1/2016 | Sun | H04B 1/0475 455/114.2 |
| 2016/0182113 A1* | 6/2016 | Wu | H04B 1/3888 455/575.8 |

OTHER PUBLICATIONS

Fire Frost Tech, "iPhone 7 Case Mate Waterfall Naked Tough Clear Case", youtube, Sep. 18, 2016, p. 3, Retrieved from the Internet:URL: https://www.youtube.com/watch?v=nNaFSUIHdyA [retrieved on Jul. 24, 2018].

Stiegman, "Glitter Liquid Phone Cases Are Leaking and Giving People Severe Burns," Seventeen Celebrity, May 12, 2017, p. 4, Retrieved from the Internet: URL: https://www.seventeen.com/health/news/a47163/glitter-phone-case-burns/ [retrieved on Jul. 23, 2018].

International Search Report and Written Opinion for PCT/US2018/035885; dated Aug. 1, 2018; 16 pgs.

* cited by examiner

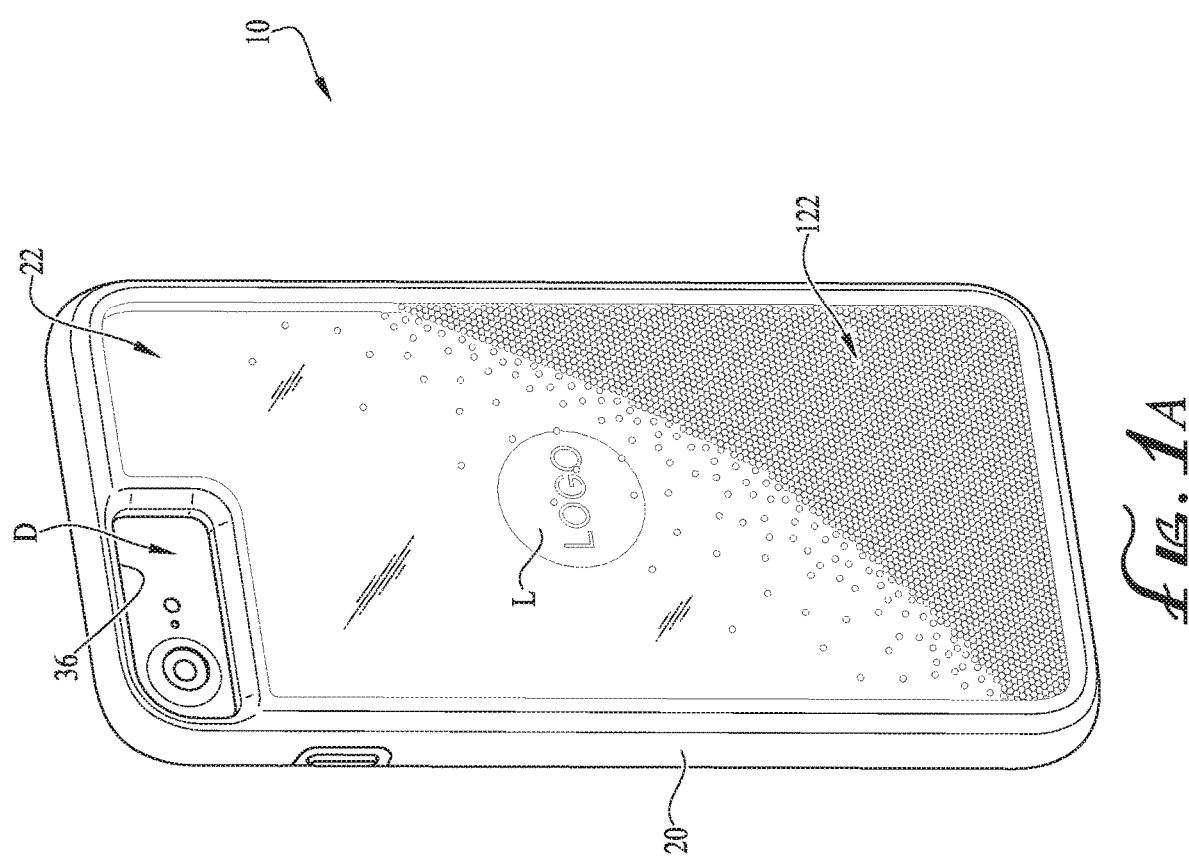

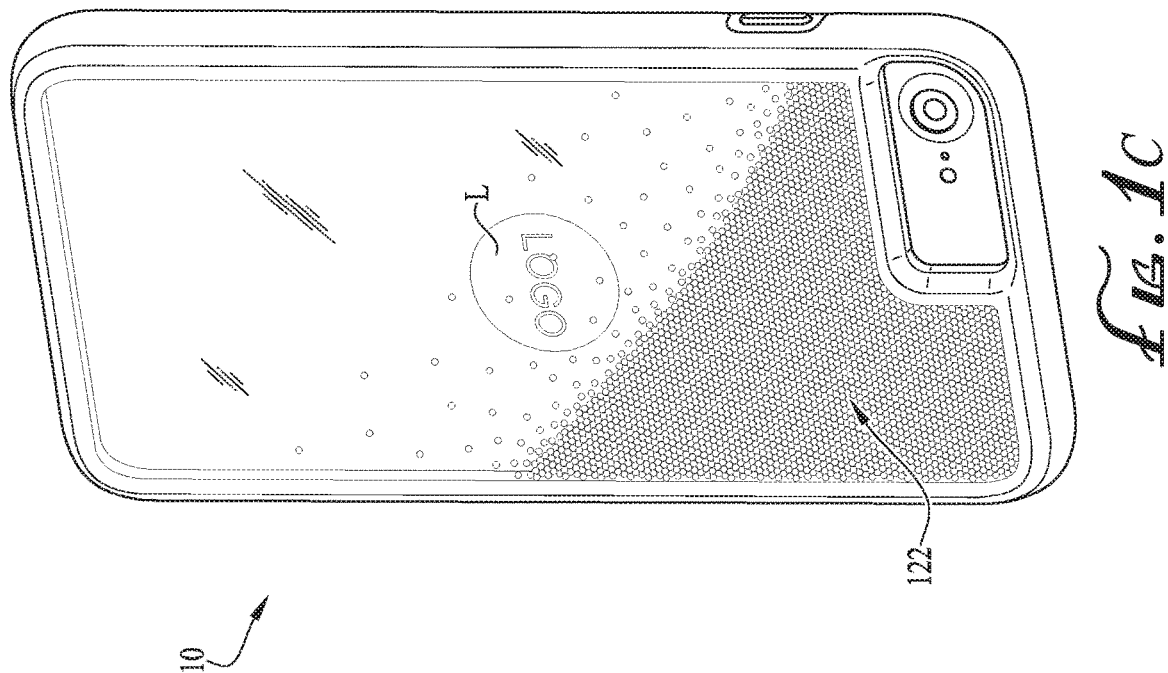
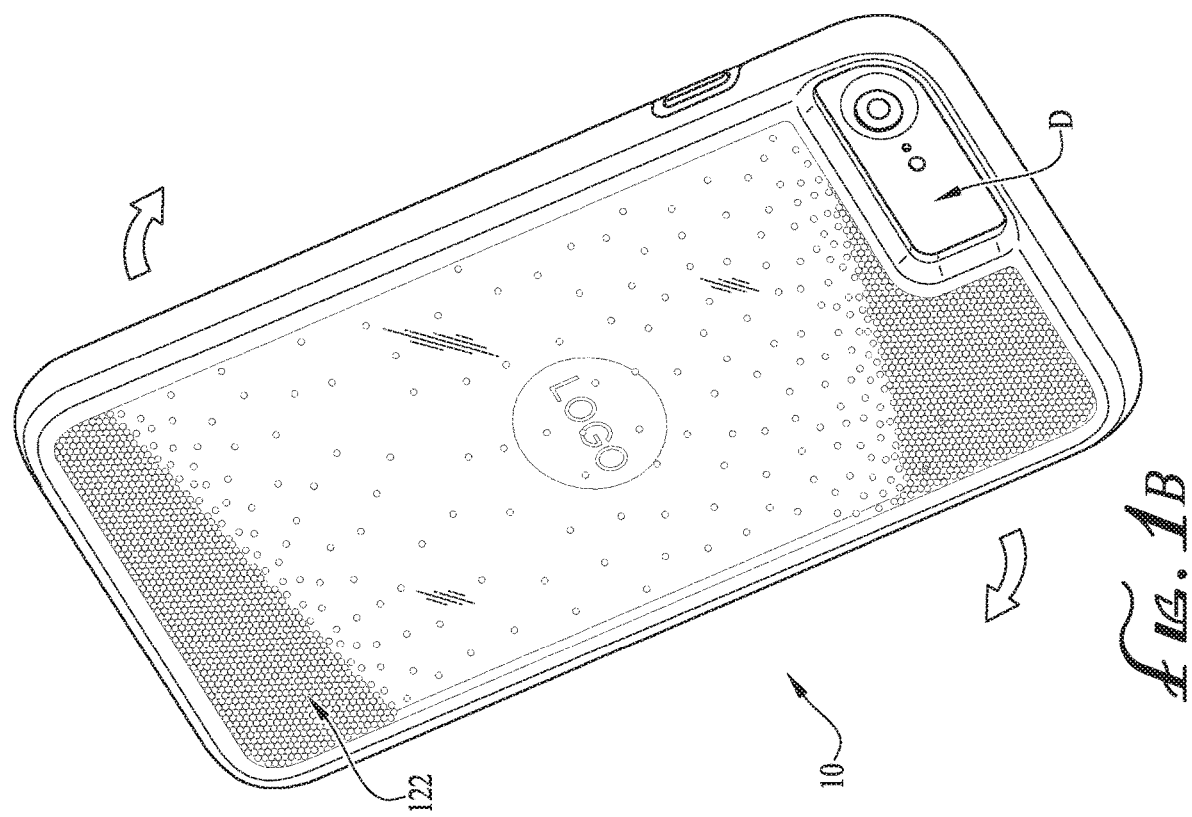

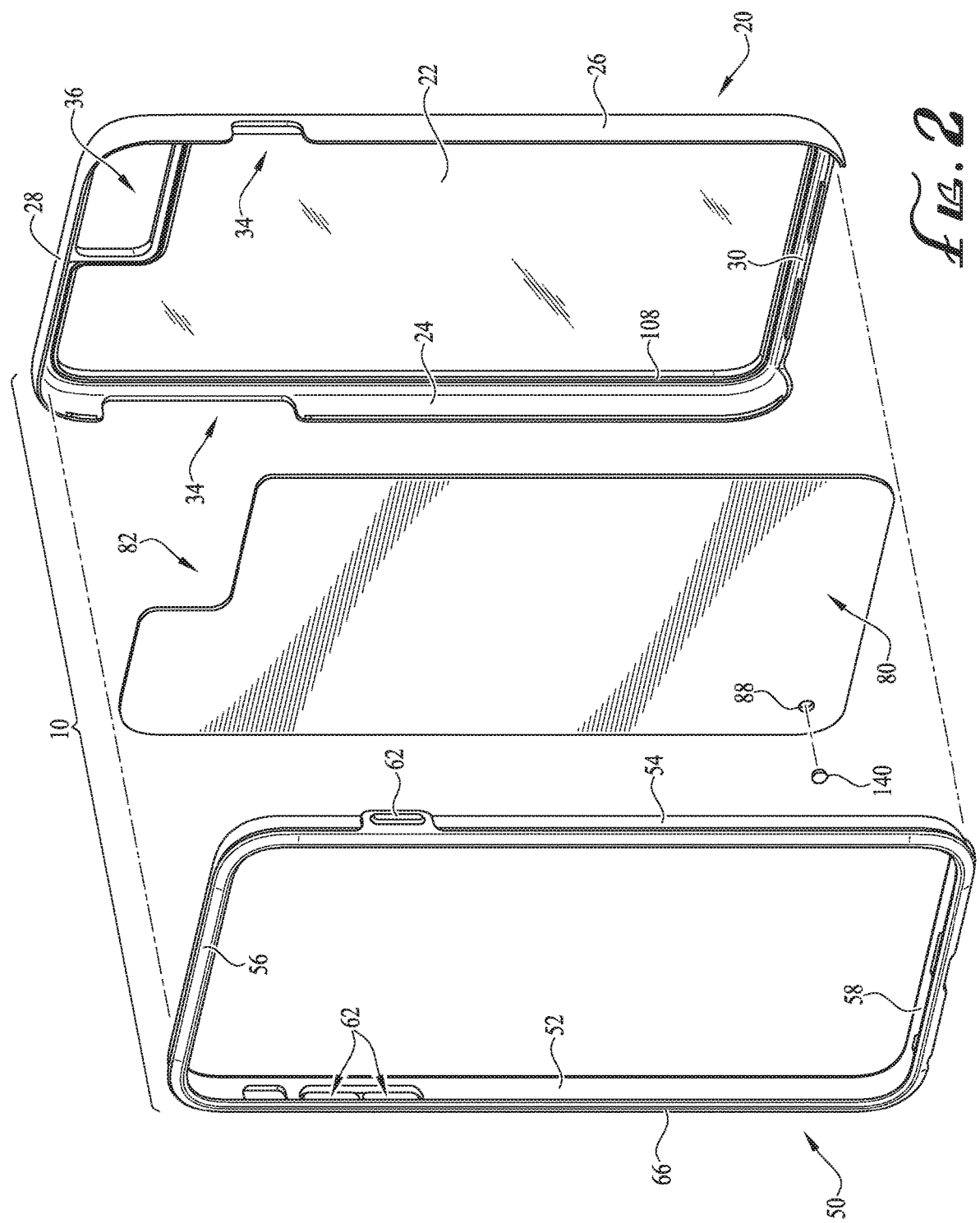

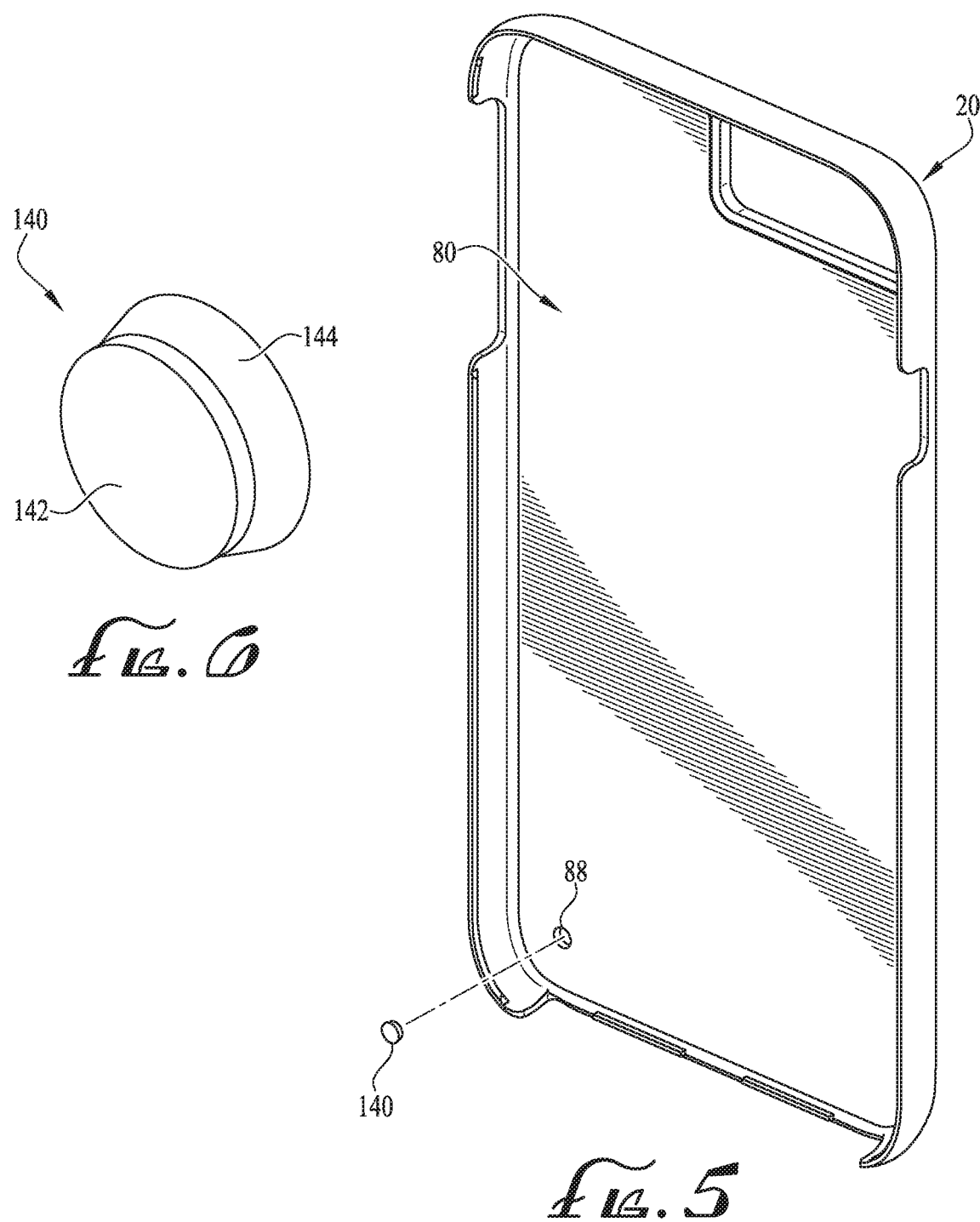

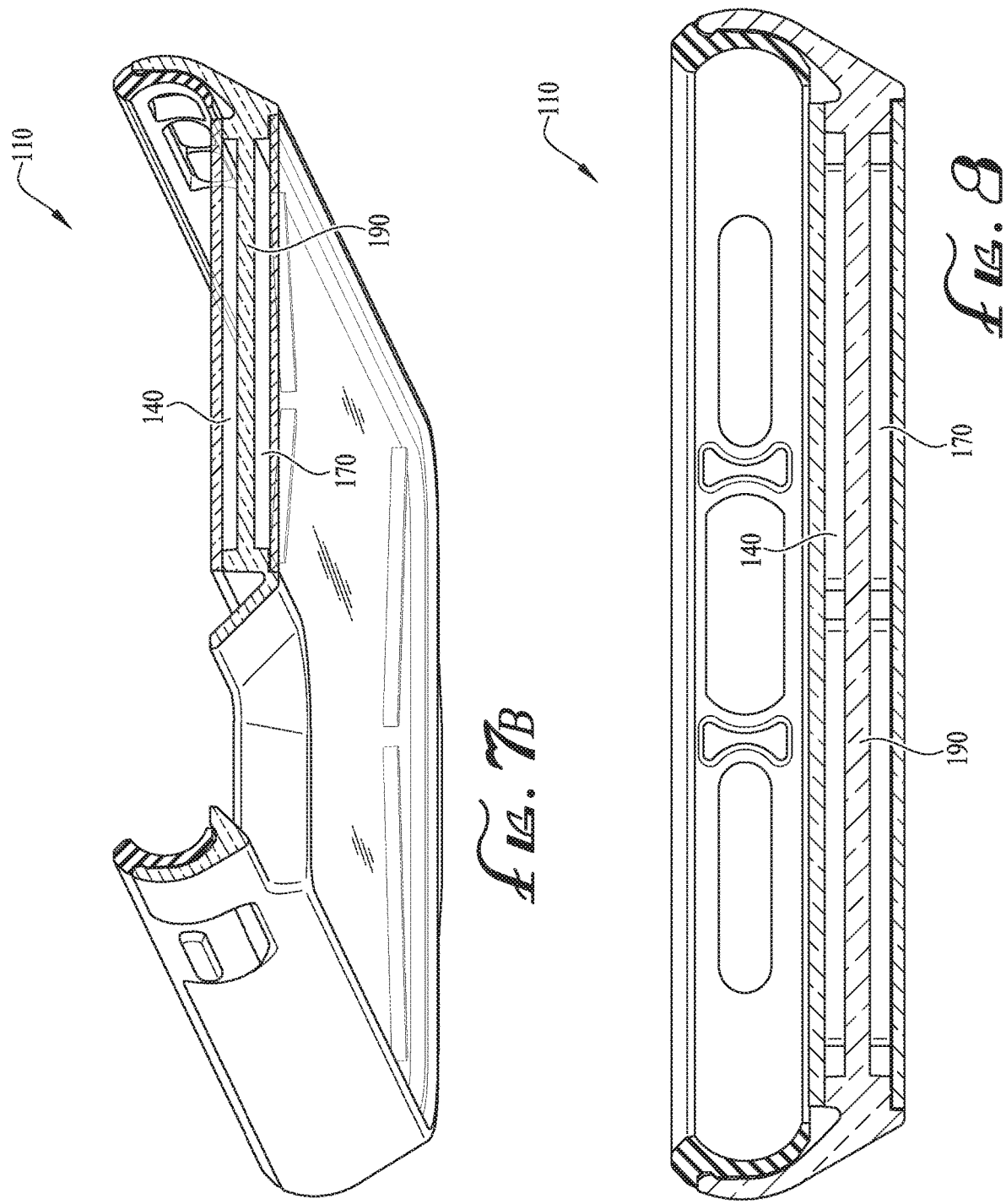

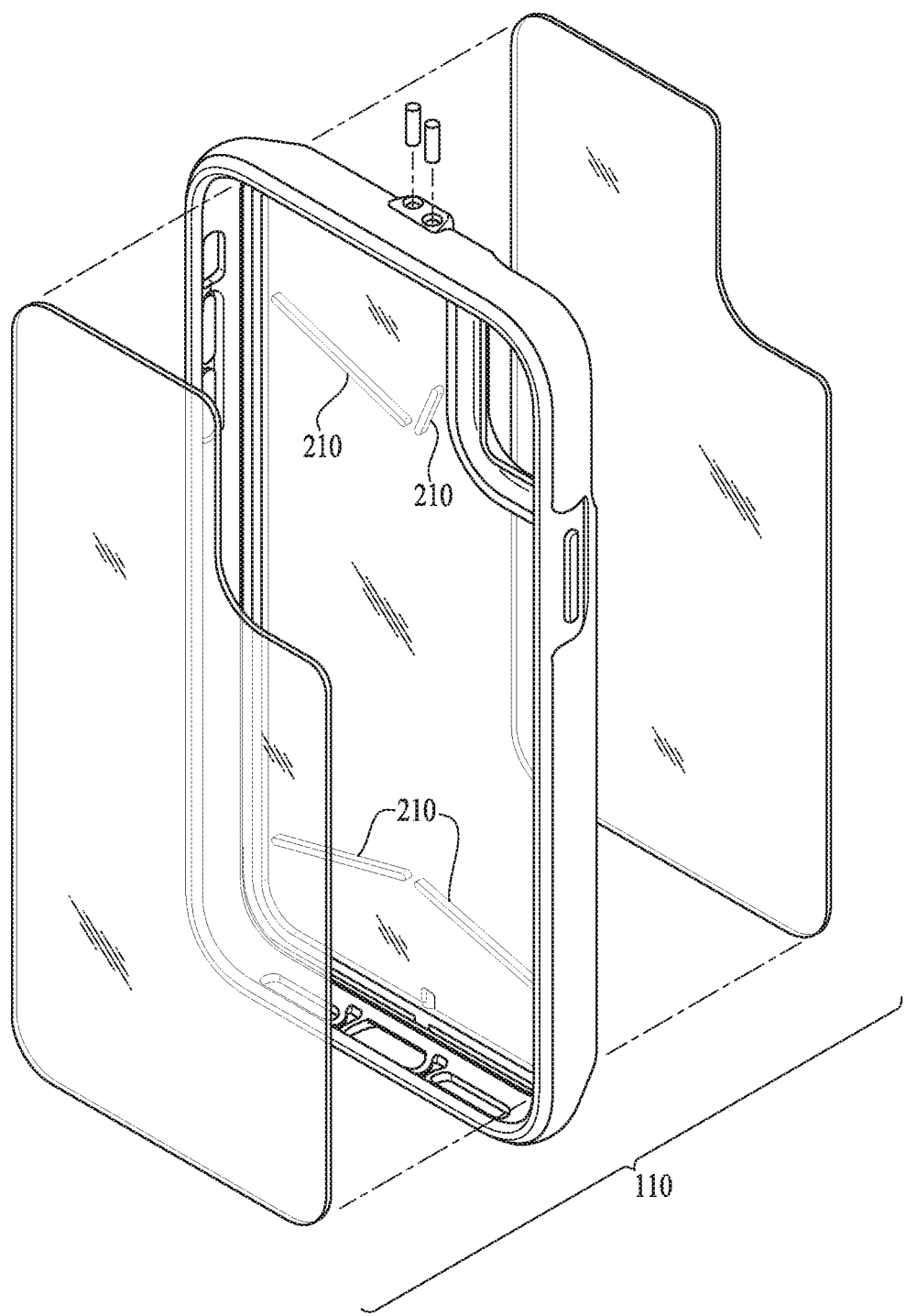

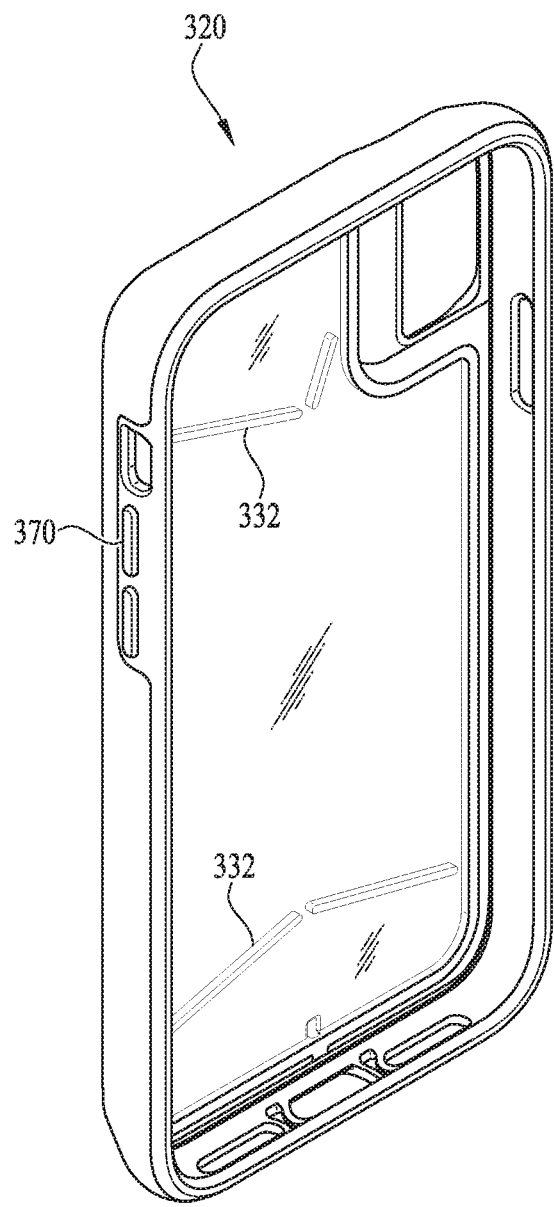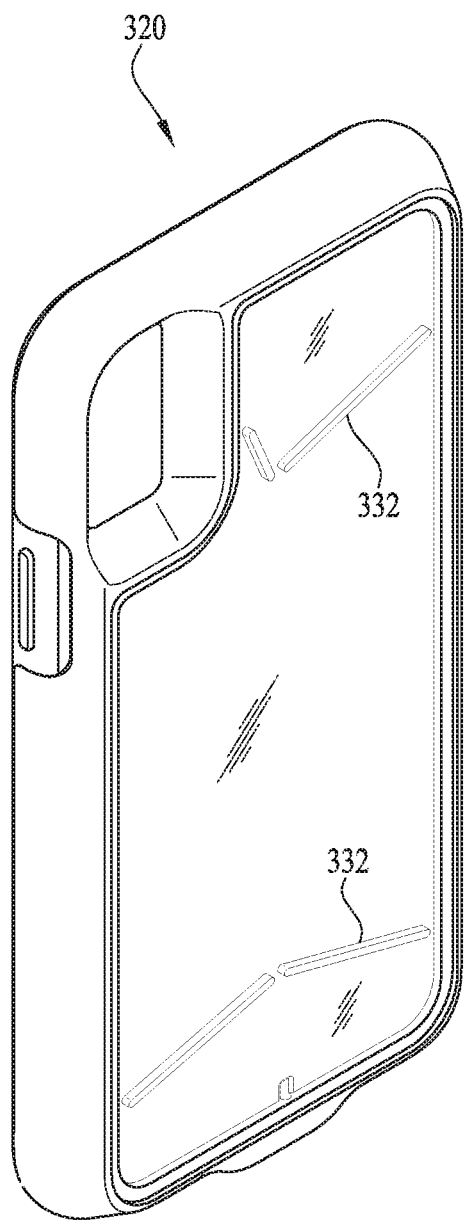

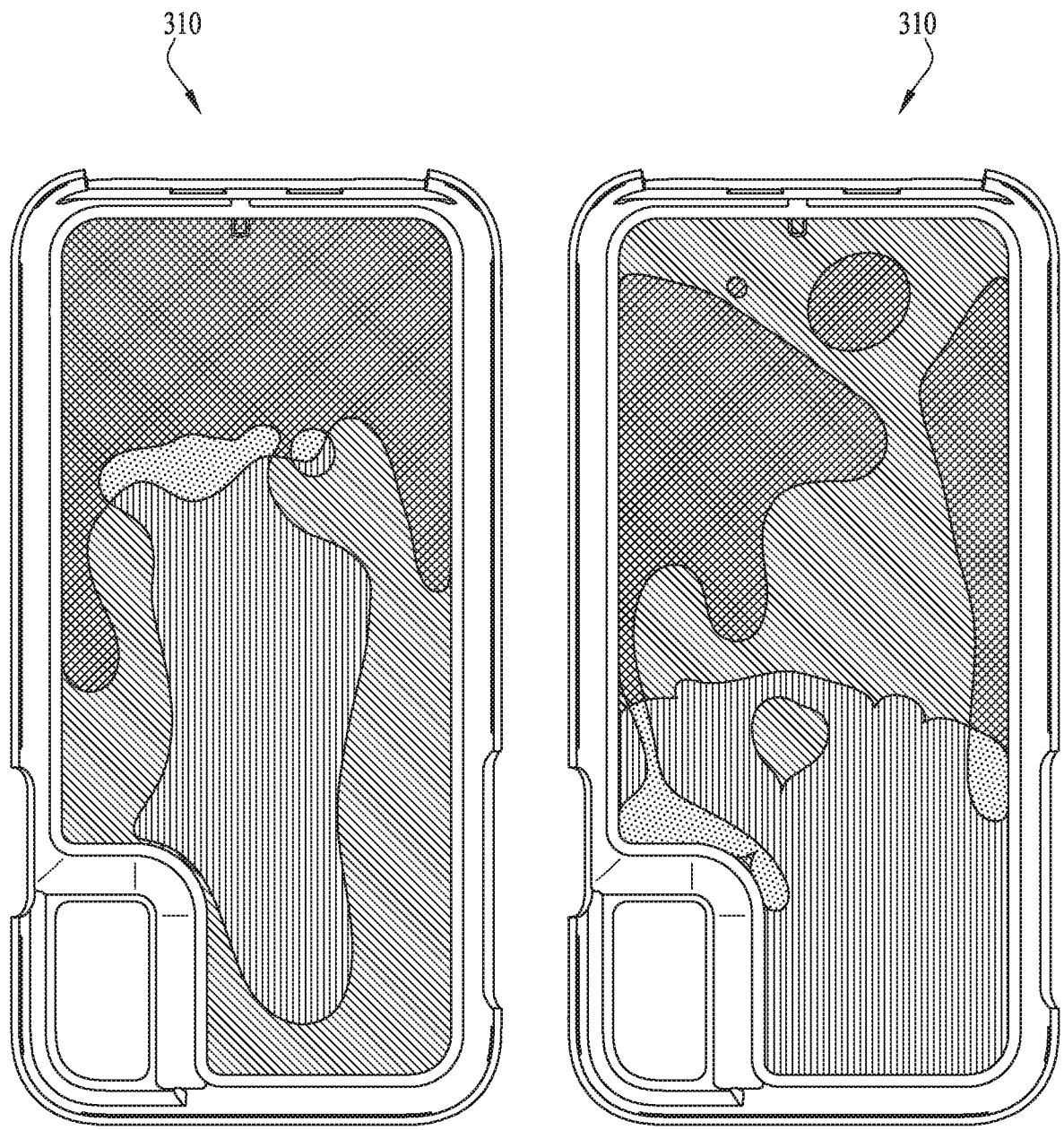

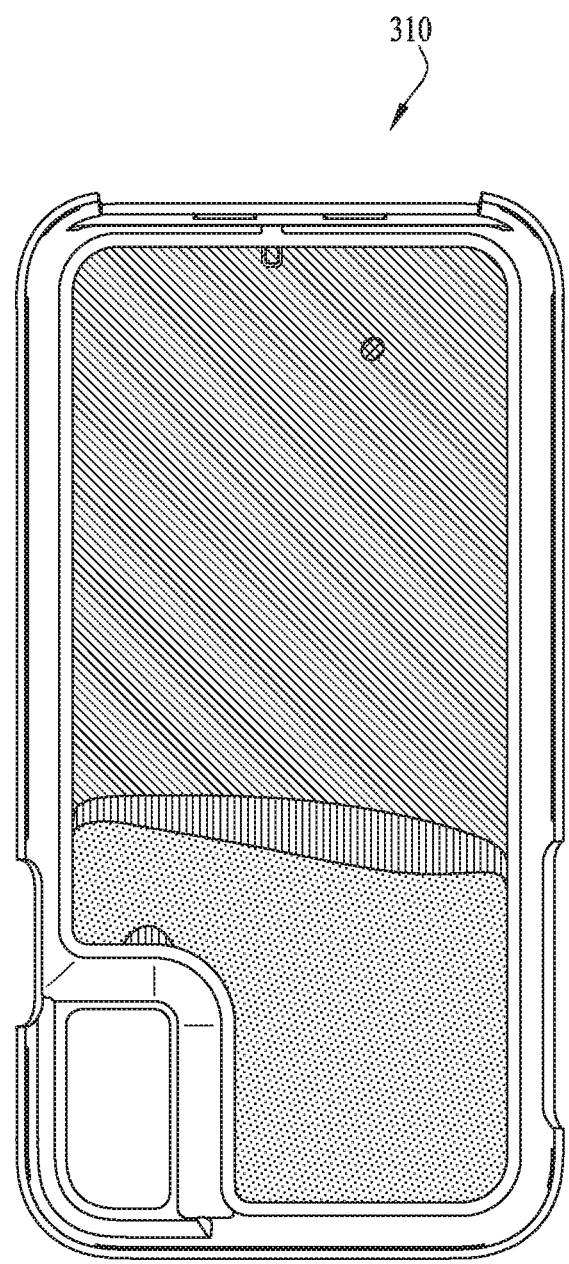

ELECTRONIC DEVICE CASE WITH SEALED LIQUID-CONTAINING CHAMBER AND HETEROGENEOUS LIQUID MIXTURE DISPLAY

CROSS-REFERENCE TO RELATED APPLICATIONS

This application claims the priority benefit of U.S. Provisional Patent Application Ser. No. 62/678,217 filed May 30, 2018, U.S. Provisional Patent Application Ser. No. 62/568,050 filed Oct. 4, 2017 and U.S. Provisional Patent Application Ser. No. 62/530,373 filed Jul. 10, 2017, the entireties of which are hereby incorporated herein by reference for all purposes.

TECHNICAL FIELD

The present invention relates generally to the field of protective cases or covers for cell phones and other electronic devices, and more particularly to a protective and/or decorative case having one or more hermetically sealed liquid filled chambers with an ultrasonically welded joint on the inside of the plastic main back shell, and optionally one or more additional sealed liquid filled chambers visible from an external vantage point, with one or more liquid display materials contained within the case chamber(s).

BACKGROUND

Cases and covers for mobile phones, tablet computers and other handheld electronic devices may include ornamental decorative elements or visual display features. For example, cell phone cases may include a chamber containing liquid and glitter or sparkling elements that cascade down through the liquid and are visible externally through a transparent cover portion of the case. In previously known products, the hard plastic cover is ultrasonically welded to the hard or soft plastic main back shell on the outside. This exposes the delicate ultrasonic welding joint to outside forces like pressure, drop impact, etc., leading to frequent breakage and leakage of the contents of the sealed liquid filled chamber. Such cases can be prone to leaking of the liquid from the chamber, and needs exist for improved cases and improved methods for manufacturing such cases that reduce the incidence of leaking. It is to the provision of a case or cover for an electronic device meeting these and other needs that the present invention is primarily directed.

SUMMARY

In example embodiments, the present invention provides improved cases or covers for electronic devices, and improved methods for manufacturing such cases. Cases according to example embodiments of the invention include a chamber containing liquid and glitter or sparkling elements that cascade down through the liquid and are visible externally through a transparent portion of the case, with an improved sealing arrangement to prevent or reduce the incidence of leaking of the liquid from the chamber.

In one aspect, the present invention relates to a decorative cell-phone or other electronic device case or cover with a hermetically sealed liquid filled chamber with an ultrasonically welded joint on the inside of the plastic main back shell to prevent leakage of material from the chamber.

In another aspect, the invention relates to a method for manufacturing such a case or cover, and for forming a hermetically sealed liquid filled chamber in or on a cell-phone or other electronic device case or cover with improved sealing characteristics and leak resistance.

In still another aspect, the invention relates to a case for an electronic device. The case preferably includes a shell defining an interior space for receiving the electronic device. The shell preferably includes a chamber having a liquid contained within the chamber, and a transparent portion through which the liquid is visible from external of the case. A seal is preferably formed around the chamber to contain the liquid therein, the seal being located within the interior space of the shell.

In another aspect, the invention relates to a case for an electronic device, the case preferably including a back shell comprising a back panel and at least one sidewall extending from the back panel. At least a portion of the back panel is preferably transparent, and the back shell preferably defines an internal recess. The case preferably also includes an inner cover configured to extend over the internal recess of the back shell to form a chamber between the back shell and the inner cover. A liquid is preferably contained within the chamber formed between the back shell and the inner cover and is visible through the transparent portion of the back panel from an external vantage point. The liquid is preferably sealed within the chamber by a continuous seal formed between the back shell and the inner cover around the internal recess of the back shell.

In another aspect, the invention relates to a case for an electronic device, the case preferably including a back shell having a back panel, and at least a portion of the back panel being transparent. The back shell preferably defines an internal recess. The case preferably also includes an inner cover configured to extend over the internal recess of the back shell to form a chamber between the back shell and the inner cover. A liquid is preferably contained within the chamber and is visible through the transparent portion of the back panel from an external vantage point. The liquid is preferably sealed within the chamber by a seal located internally within the case.

In another aspect, the invention relates to a method of fabricating a case for an electronic device. The method preferably includes the steps of providing a back shell having a transparent back panel and an internal recess, installing an inner cover over the internal recess, forming a seal internally within the case between the inner cover and the back shell around the internal recess to define an enclosed chamber, introducing a liquid and decorative elements into the enclosed chamber through a fill hole, and closing the fill hole with a stopper.

In another aspect, the invention relates to a multi-chambered case for an electronic device, wherein each of a plurality of sealed chambers contains a first liquid component and a second liquid component that is immiscible with the first liquid component.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIGS. 1A, 1B and 1C show a case or cover for a cell-phone or other electronic device according to an example embodiment of the invention, in different orientations showing a cascading movement of decorative elements through a liquid within a sealed chamber and visible through a transparent portion of the case.

FIG. 2 is an assembly view of the case or cover of FIG. 1.

FIG. 5 is a perspective view of the case or cover of FIG. 1, showing installation of a stopper.

FIG. 6 is a detailed view of the stopper of FIG. 5, according to an example form of the invention.

FIGS. 7A and 7B show a case or cover for a cell-phone or other electronic device according to another example embodiment of the invention, having multiple sealed liquid filled chambers.

FIG. 8 shows a cross-sectional view of the multi-chambered case shown in FIG. 7.

FIG. 9 shows an assembly view of the multi-chambered case shown in FIG. 7.

FIGS. 13A and 13B show front and back views of the case shell of the electronic device case shown in FIG. 10.

FIGS. 16A-16E show a sequence of liquid flows of the display liquids within the display chambers upon inversion of the case of FIG. 10.

FIGS. 18A and 18B show a case or cover for a cell-phone or other electronic device according to an example embodiment of the invention.

DETAILED DESCRIPTION OF EXAMPLE EMBODIMENTS

Figure 3:
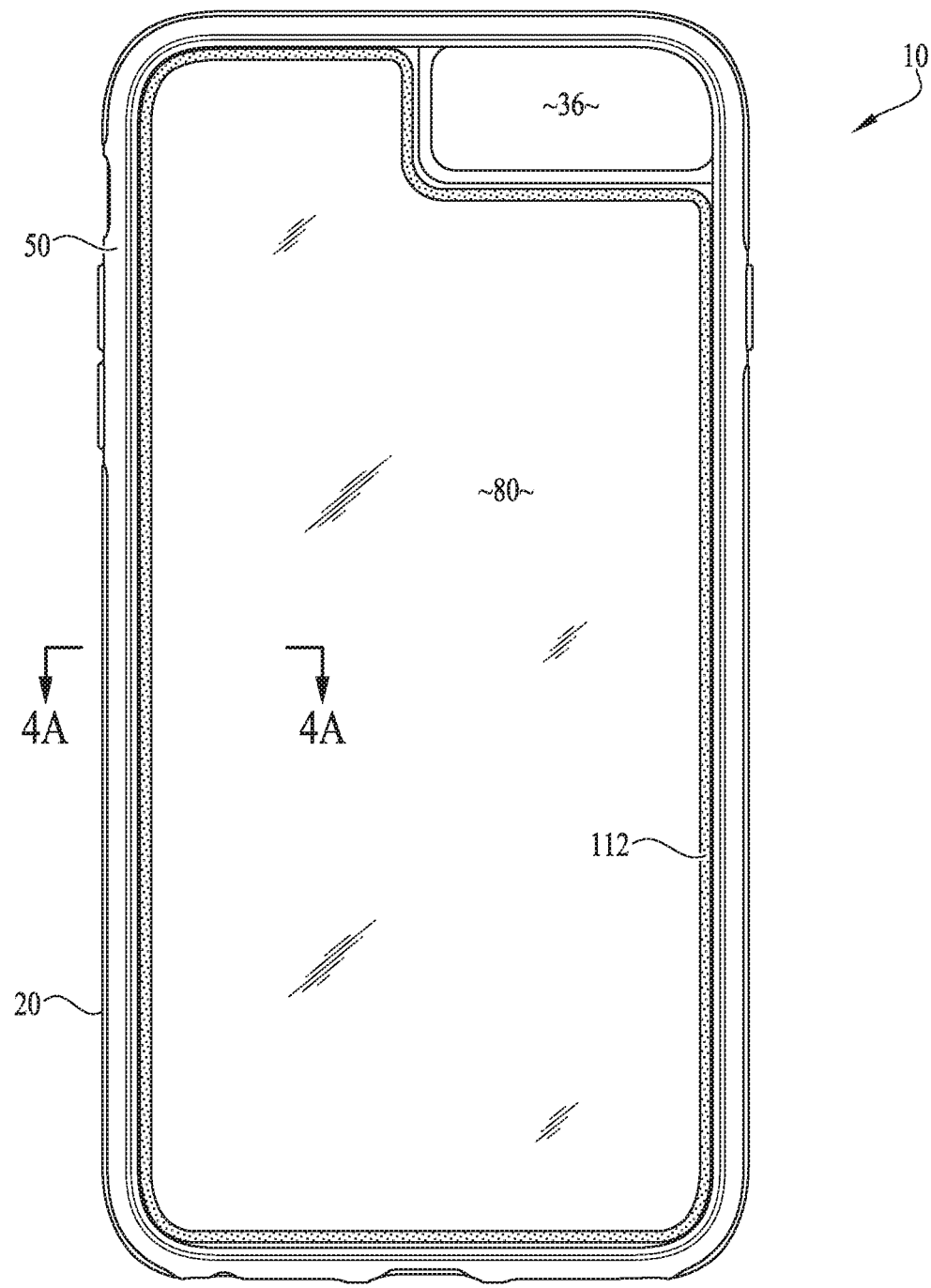
FIG. 3 is a plan view of the inside of the case or cover of FIG. 1.

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-6 show example embodiments of a case or cover 10 for a cell-phone, smart phone, tablet computer or other portable handheld electronic device D, and steps of a method for manufacturing such a case or cover, according to example embodiments of the present invention. In example embodiments of the case 10 according to the present invention, the hard plastic cover is ultrasonically welded to the hard or soft plastic main back shell on the inside, greatly reducing probability of breakage as compared to previously known cases wherein the hard plastic cover is ultrasonically welded to the hard or soft plastic main back shell on the outside.

U.S. Pat. No. 8,695,798 is incorporated herein by reference to show additional details of a type of case to which the liquid filled chamber and seal arrangement of the present invention may be adapted. However, the present invention may also be adapted to any construction/configuration of a decorative and/or protective case or cover for a cell-phone or other electronic device with a hermetically sealed liquid filled chamber.

FIGS. 1-6 show details of the case 10 according to an example embodiment of the invention. The case 10 comprises a hard or soft plastic main back shell 20 having a back panel 22 at least partially comprising one or more transparent portions, one or more sidewall portions extending from the back panel. In the depicted embodiment, first and second sidewall portions 24, 26, a top panel 28, and a bottom panel 30 extend generally perpendicular and forward from the back panel 22. The back panel 22 and peripheral walls 24, 26, 28, 30 thus define an interior receiver space for receiving and housing the device D. Optionally, one or more cutout sections 34 are provided along one or more of these peripheral walls to allow access to controls, speakers, microphones or other features of the electronic device D when the case 10 is installed onto the device. The back panel optionally comprises a camera cutout 36 formed therein for accommodating camera and flash elements of the device D. In example embodiments, the main back shell 20 is formed from polycarbonate, polyethylene, polyurethane or other material(s).

The case 10 optionally also comprises a soft plastic bumper 50 configured to fit within the periphery of the back shell 20, to securely but removably retain the device D within the case while in use. The bumper 50 and peripheral walls of the back shell optionally include cooperating engagement features such as interengaging projections and recesses formed therein or thereon, to provide a detachable coupling of the elements with the electronic device D sandwiched therebetween. In example embodiments, the bumper 50 comprises a generally rectangular frame with a central opening formed therein, and is molded from thermoplastic polyurethane (TPU) or other resilient and compressible material. The bumper 50 comprises first and second sidewalls 52, 54, a top panel 56 and a bottom panel 58, configured to fit closely within corresponding peripheral walls of the back shell 20. The bumper 50 optionally comprises one or more outwardly projecting portions, for example incorporating actuator buttons 62 or other features, and positioned and configured to be received within corresponding cutout portions 34 of the peripheral walls of the back shell 20 and align with control features or other elements of the electronic device D when the case 10 is assembled. The bumper 50 optionally also comprises one or more openings allowing communication therethrough, and in alignment with speakers, microphones and/or other user interface portions of the device D when installed and in use. An outwardly and/or inwardly projecting flange or lip 66 is optionally provided along the front edge of the bumper for engagement with the peripheral walls of the back shell 20 and with the device D when assembled.

The case further comprises a hard plastic inner cover 80, configured to fit within the back shell 20, along the inside face of the back panel 22. The inner cover 80 is optionally transparent, whereby branding information such as logo L or other features of the electronic device D are visible from an external vantage point, through back shell 20 and inner cover 80 of the case. The inner cover 80 optionally also includes a recess or cutout section 82 configured to accommodate the camera and flash of the device D. A hole or opening 88 is provided through the inner cover to permit filling of the liquid filled chamber, as described further below. In example embodiments, the inner cover 80 is formed from polycarbonate, polyethylene, polyurethane or other material(s).

Figure 4A:
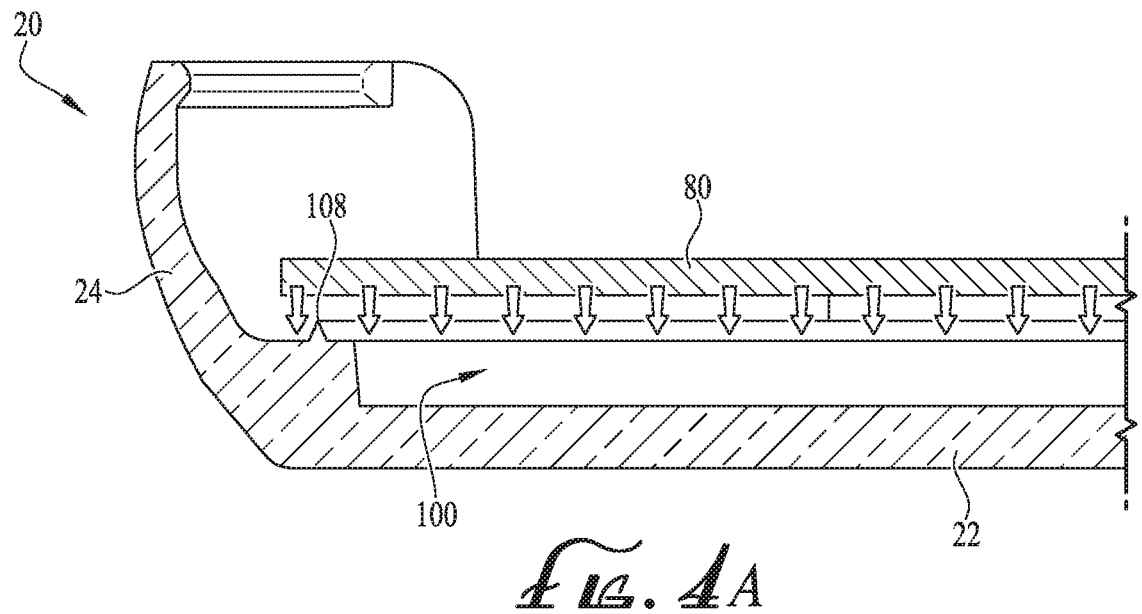
FIGS. 4A and 4B show cross-sectional views of a seal portion of the case or cover according to an example form of the invention, taken along cut line 4A-4A in FIG. 3, and showing formation of the seal (FIG. 4A) and the final formed seal arrangement (FIG. 4B).
Figure 4B:
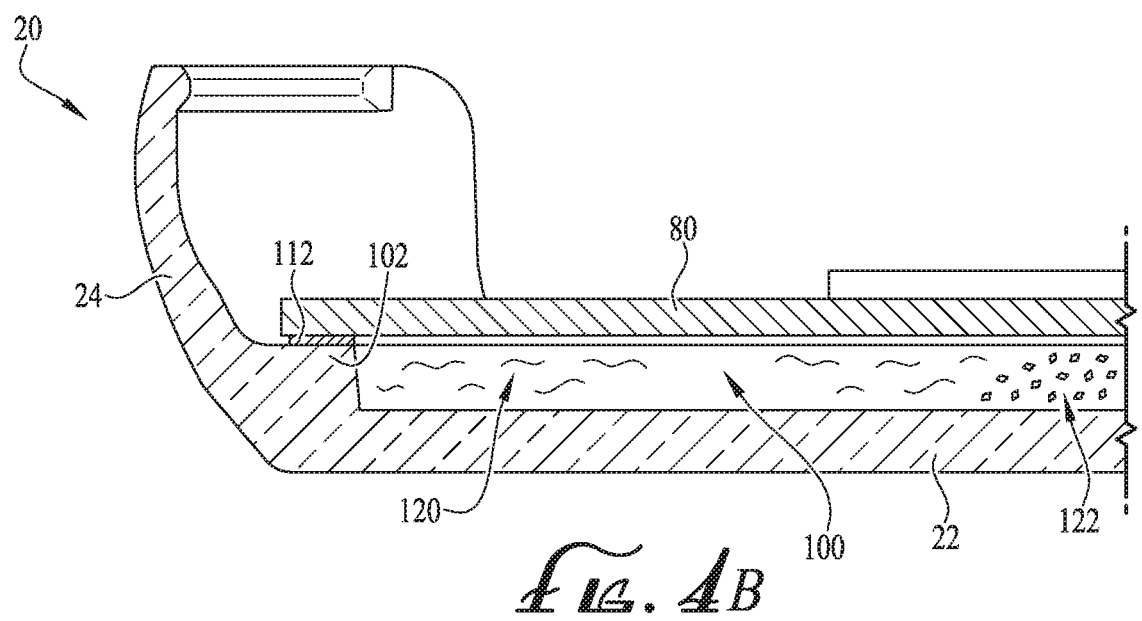

As seen best with reference to FIGS. 4A and 4B, a continuously and hermetically sealed chamber is formed between the inside of the back shell 20 and the inner cover 80. For example, an interior recess 100 can be provided in the back shell, on its front or inner surface (i.e., adjacent the space within which the electronic device D is received into the case 10) to define an open space or void forming the chamber. In example embodiments, the back shell 20 comprises a raised surface or shoulder 102 extending continuously around the recess 100 to provide a sealing surface arranged along the inside periphery of the back shell and spaced a small distance inwardly from the peripheral walls of the back shell. In example embodiments, a thin fin or flange, for example having a triangular peaked cross-sectional configuration projects forward from the shoulder 100 forming an energy director joint or boss 108, to form a seal 112 between the back shell 20 and the inner cover 80. As seen best with reference to FIG. 3, the seal 112 forms a continuous band completely surrounding a bounded space within the inside periphery of the case 10, to enclose and hermetically seal the chamber 100 formed between the back shell 20 and the inner cover 80. Because the seal 112 is located within the interior of the case 10, between the device D and the back panel 22, it is less susceptible to contact and potential breach of the seal when the case is in use. In example embodiments, the seal 112 is formed by ultrasonic welding, by pressing the inner cover 80 against the raised boss or energy director joint 108 of the back shell 20. Ultrasonic energy is applied in combination with the application of pressure to melt the material of the energy director joint 108 and fuse the inner cover 80 with the shoulder 102 of the back shell, with the melted material of the energy director joint forming a butt joint making the seal 112. In alternative embodiments, the seal may be formed by thermal welding, solvent bonding, adhesive, one or more sealing members, or other sealing means.

A liquid 120, such as for example mineral oil or water, and decorative elements 122, such as for example metallic glitter or beads, are introduced into the chamber 100 through the fill hole 88 in the inner cover 80. In example embodiments, at least a portion of the liquid 120 and/or the decorative elements 122 can include one or more fluorescent, phosphorescent or luminescent (i.e., glow-in-the-dark) materials, particles and/or elements. The fill hole 88 is closed or sealed, for example by insertion of a soft plastic stopper 140, as shown in FIGS. 5 and 6. In example embodiments, the stopper 140 is formed from a thermoplastic elastomer or other soft plastic material suitable for compression fit and sealing within the fill hole 88, and has a smaller inner portion 142 and a flared or expanded outer portion 144.

In use, the user places the soft plastic bumper 50 around their phone or other electronic device D, and inserts the phone and bumper into the back shell 20, securing the device in the case 10. The device D is then used in typical fashion, with the case 10 protecting the device and providing an aesthetically appealing appearance. By flipping or turning the case 10 and device D around, for example end-over-end or sideways, as shown in FIGS. 1B and 1C, the decorative elements 122 cascade downwardly under influence of gravity through the liquid 120, providing an entertaining motion effect visible through the transparent back panel 22 from an external vantage point behind the case (i.e., opposite the device D). Because the seal 112 containing the liquid 120 and decorative elements 122 within the sealed chamber 100 is located internally within the case 10, it is less susceptible to contact and potential damage which might result in leakage of the liquid from the chamber than would be the case with an external seal. Also, in some embodiments the back of the device D housed within the case 10 may be held in contact against the inner cover 80, optionally applying compression to the seal 112, further improving the seals integrity.

Figure 7A:
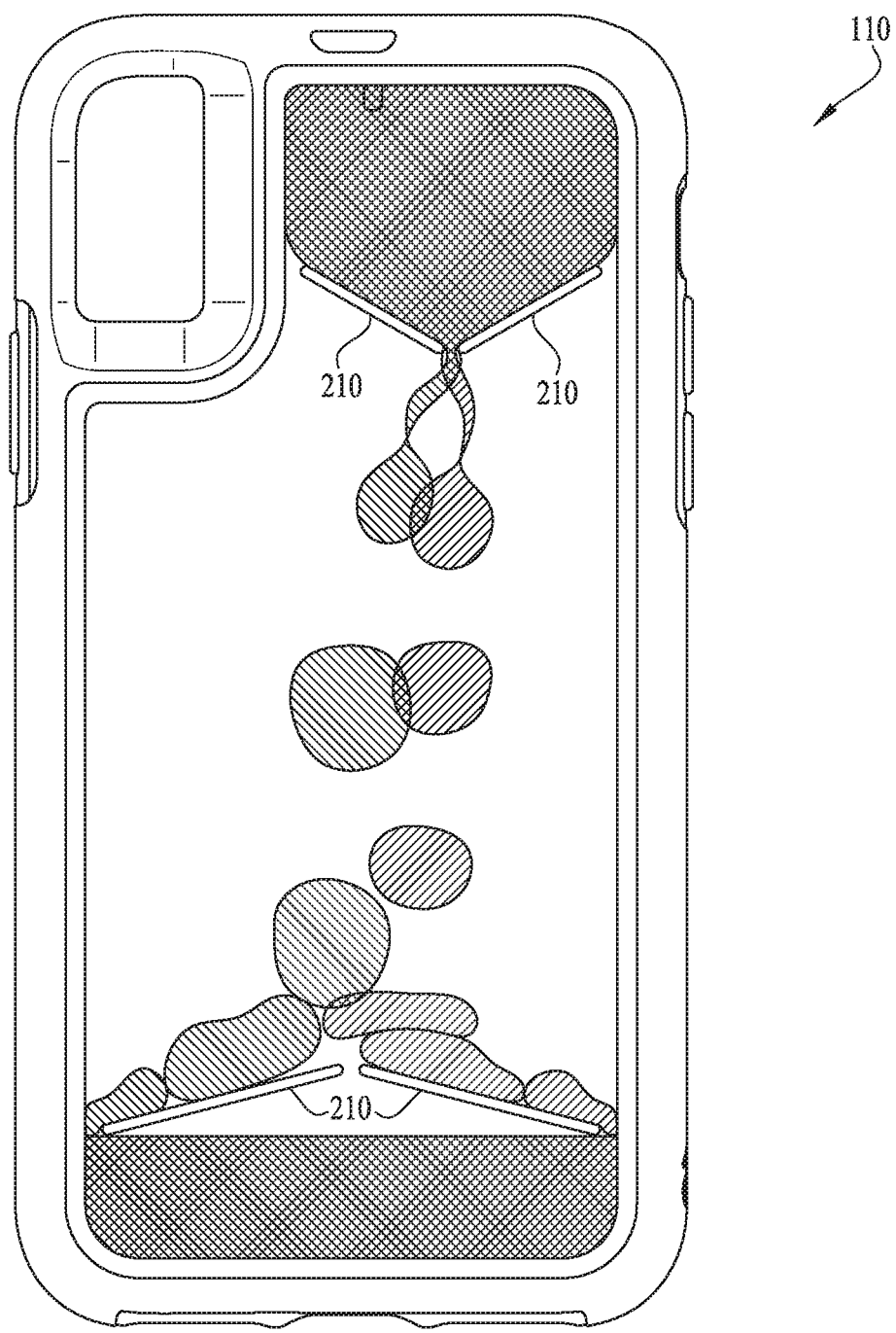
Figure 10:
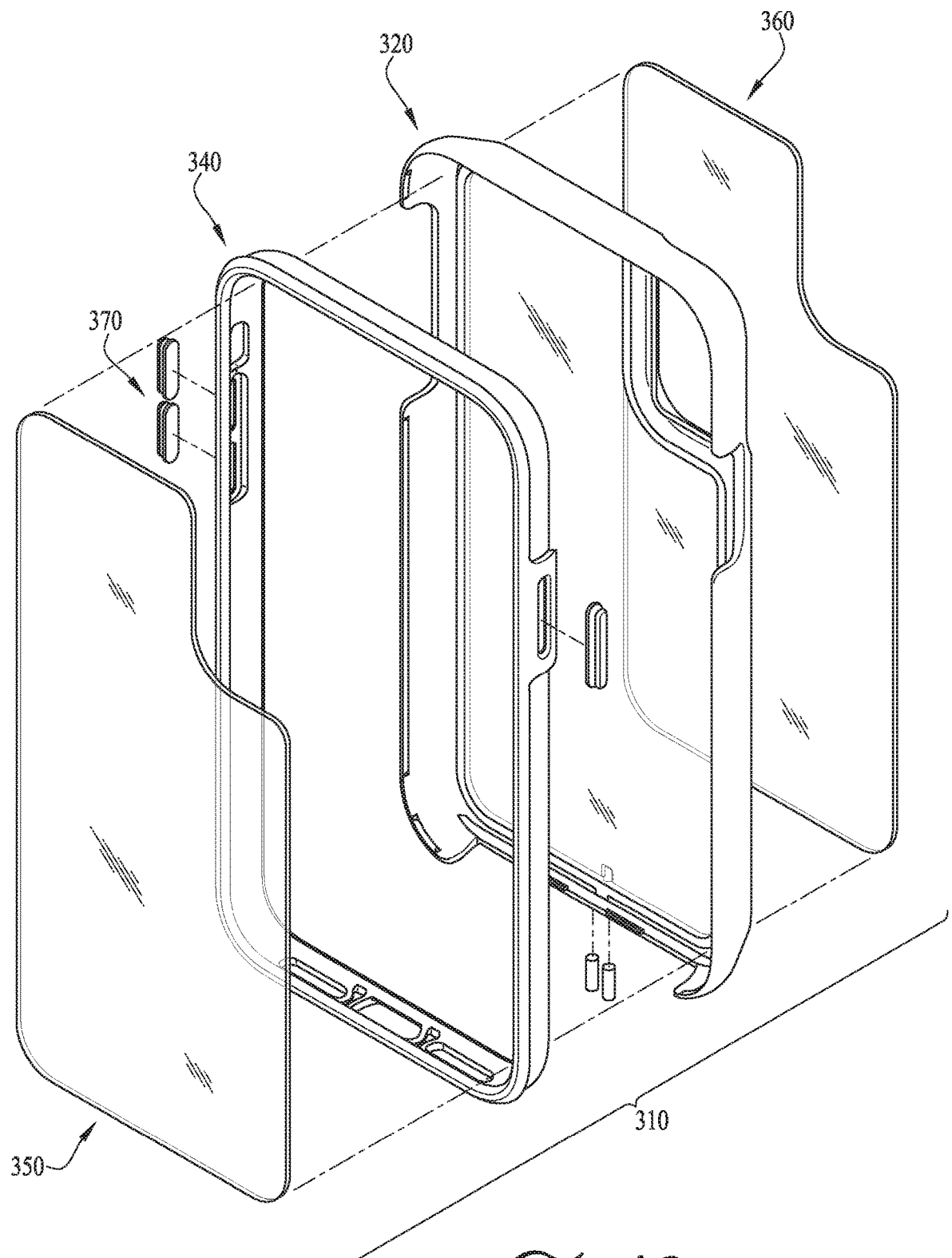
FIG. 10 shows an assembly view of the case shell of a multi-chambered electronic device case according to another example embodiment of the invention.

FIGS. 7-9 show a case or cover 110 for an electronic device according to another example embodiment. The case 110 includes an inner sealed chamber 140 and an outer sealed chamber 170. Each of the chambers 140, 170 can be partially or substantially fully filled with one or more liquid components, for example a lower density first liquid component and a higher density second liquid component. In example embodiments, the first and second liquid components are of different color or appearance, for example the first liquid component being substantially clear or transparent, and the second liquid component being colored; or alternatively being of contrasting colors. In example embodiments, a substantially transparent wall 190 divides and separates the two chambers 140, 170, allowing external visibility of the contents of both chambers. In example embodiments, the inner sealed chamber 140 is configured in substantially similar fashion to the above described embodiment. A fill spout or other sealable opening may be provided in fluid communication with each of the chambers 140, 170 to deliver the respective liquid components therein. Optionally, one or more obliquely angled flanges or flow-directing weirs 210 are provided within one or both of the chambers 140, 170 to direct the flow of the liquid component(s) contained therein, for enhanced visual effect. In example embodiments, two opposed pairs of inversely angled flanges or flow-directing weirs 210, each pair having a space between them, respectively funnel and disperse the flow of liquid in a first flow direction, and disperse and funnel the flow in an opposite second flow direction when the case 110 is inverted. While the depicted embodiment includes two sealed liquid filled chambers, in alternative embodiments, three or more sealed liquid filled chambers may be included at one or more portions of the case, in various multiple chamber or multi-chamber case configurations.

FIGS. 10-16 show a case or cover 310 for an electronic device, according another example embodiment of the invention. The case 310 generally comprises a polycarbonate (PC) or other impact-resistant hard plastic shell 320, a thermoplastic polyurethane (TPU) or other impact-resistant soft or resilient plastic bumper or liner 340, a first or inner polycarbonate or other hard plastic liquid display plate or panel 350, a second or outer polycarbonate or other hard plastic liquid display plate or panel 360, and one or more actuator button inserts 370 configured for engagement within corresponding cutouts in the liner and shell and for operative engagement with corresponding buttons or control features of the electronic device to be used with the case or cover 310. The liner 340 is optionally configured to be permanently or removably retained within the shell 320 and hold a mobile phone or other electronic device within the case 310. The outer liquid display panel 360 is preferably transparent or tinted translucent to allow visual observation of the contents from a vantage point external of the back of the case 310; and the inner liquid display panel 350 is preferably opaque white or other light color, or alternatively a transparent or tinted translucent material. In example embodiments, provision of an opaque white or other light color inner display panel 350 helps to provide greater visual contrast with the colors of the contents of the display chambers when the case is used on a device with a dark colored back surface.

The shell 320 comprises a chamber separation wall 322, forming a liquid impermeable barrier between an inner liquid chamber 324 and an outer liquid chamber 326. In example embodiments, the inner liquid chamber defines a generally rectangular recess in the front or inside of the shell 320, and the outer liquid chamber defines a generally rectangular recess in the back or outside of the shell 320. The shell 320 further comprises top, bottom, left and right sidewalls extending forward from the chamber separation wall, to define the receiver for the electronic device to be held in the case 310. The chamber separation wall 322 is preferably transparent or tinted translucent.

Figures 11, 12:
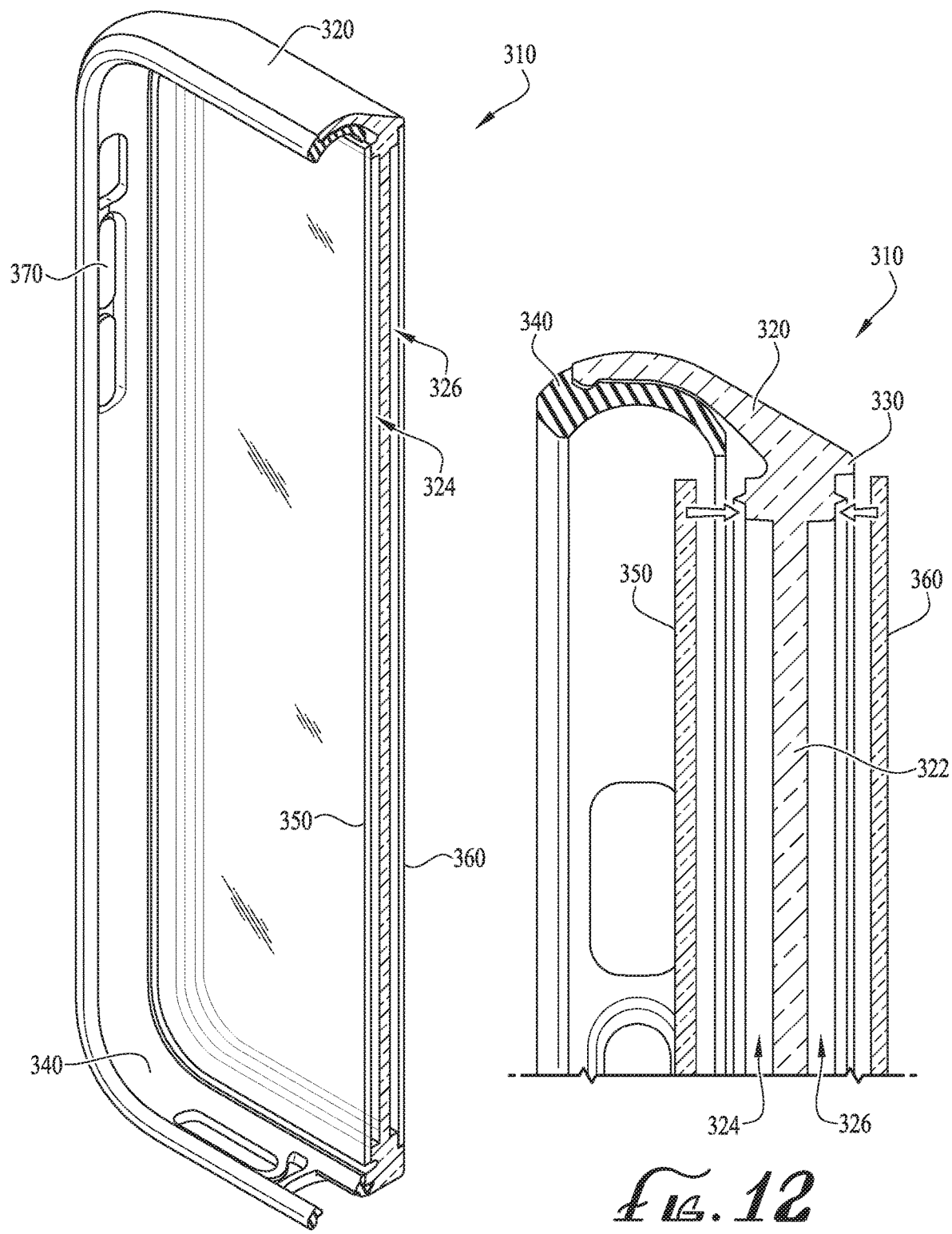
FIG. 11 is a perspective view in partial cross-section showing heterogeneous mixtures of immiscible display liquids contained in each of the chambers of the electronic device case shown in FIG. 10.
FIG. 12 is a detailed cross-sectional assembly view showing formation of the seals of the chambers of the electronic device case shown in FIG. 10.
Figure 14:
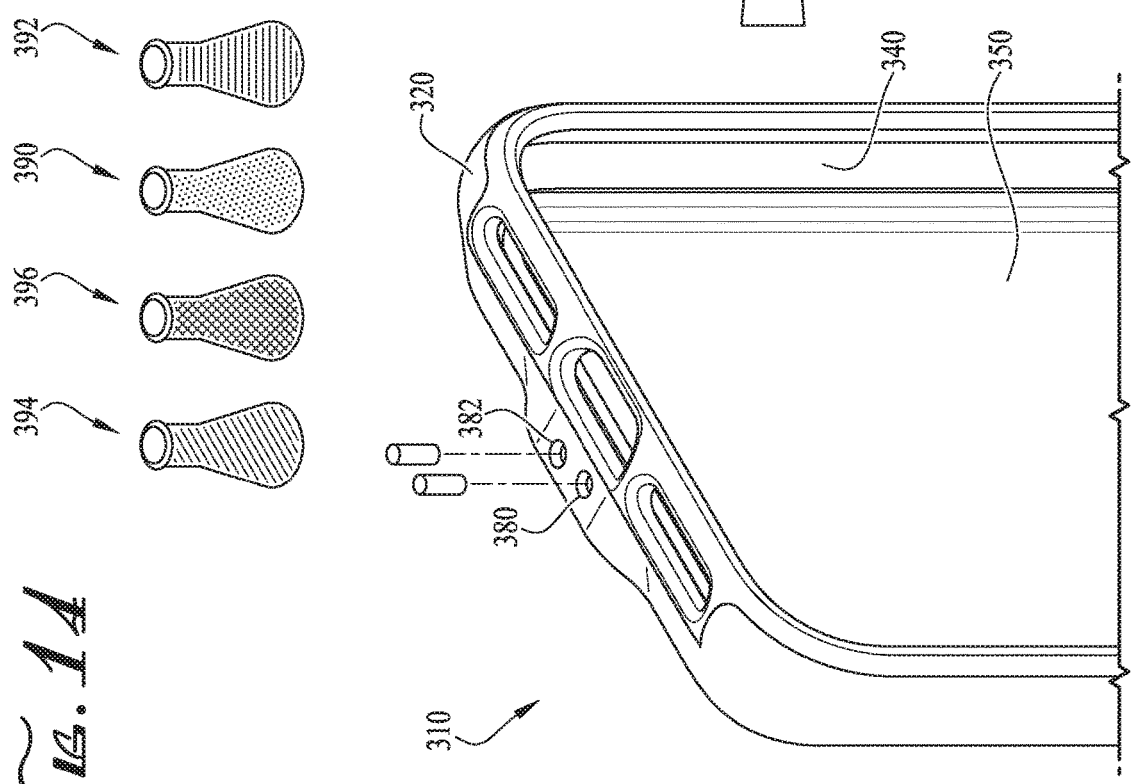
FIG. 14 shows a fill sequence process of filling each of the chambers of the electronic device case shown in FIG. 10 with different heterogeneous mixtures of immiscible display liquids to create a changing multi-colored visual display effect.
Figure 15:
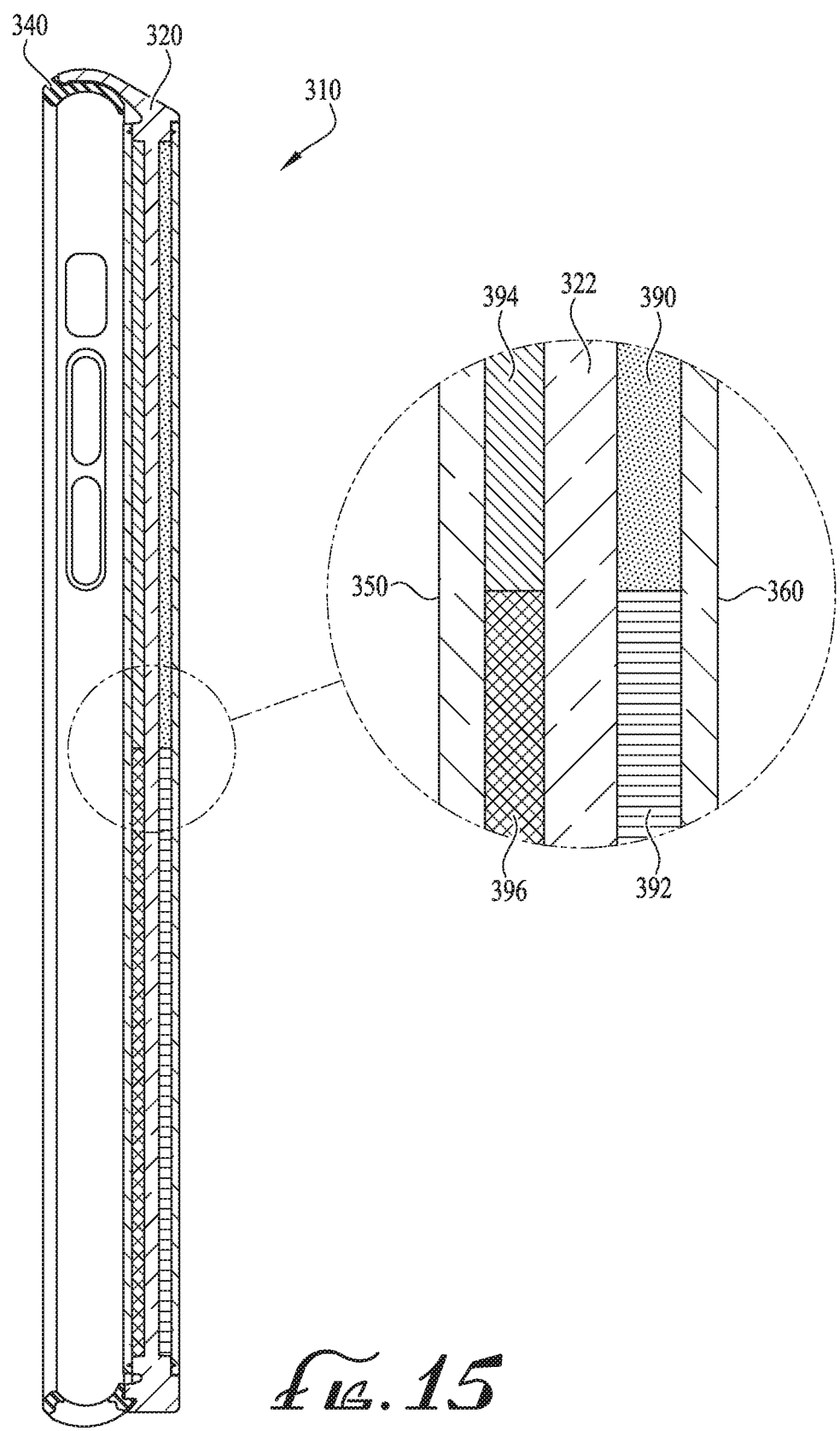
FIG. 15 is a cross-sectional view of the electronic device case shown in FIG. 10, with the display chambers of the case filled with different heterogeneous mixtures of immiscible display liquids.
Figures 16A, 16B:
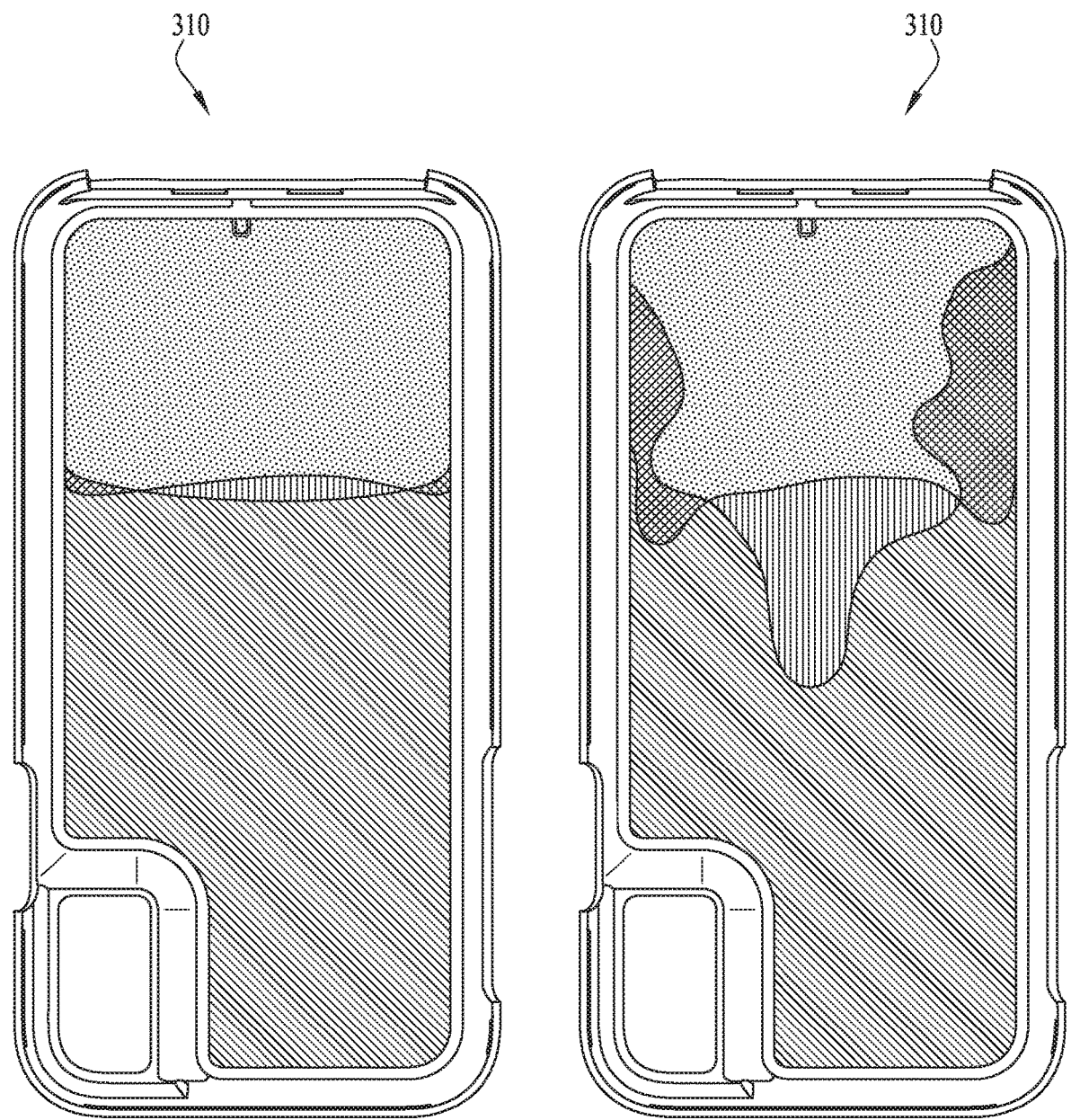

As seen best with reference to FIGS. 12 and 15, a first continuous and hermetic, liquid impervious seal is formed around the inner liquid chamber 324, between an inner flange of the shell 320 and the inner liquid display panel 350; and a second continuous and hermetic, liquid impervious seal is formed around the outer liquid chamber 326, between an outer flange of the shell 320 and the outer liquid display panel 360. In example embodiments, a first energy director joint or boss projects forward from the inner flange of the shell 320, and extends continuously around the inner liquid chamber 324, to form the seal between the shell and the inner panel 350; and a second energy director joint or boss projects rearward from the outer flange of the shell, and extends continuously around the outer liquid chamber 326, to form the seal between the shell and the outer panel 360. In example embodiments, the seals are formed by ultrasonic welding, by pressing the inner panel 350 against the inner flange of the shell 320 and pressing the outer panel 360 against the outer flange of the shell. Ultrasonic energy is applied in combination with the application of pressure to melt the material of the energy director joints and fuse the inner inner and outer panels 350, 360 with the inner and outer flanges of the shell, with the melted material of the energy director joint forming a but joint making the seal. In alternative embodiments, the seals may be formed by thermal welding, solvent bonding, adhesive, one or more sealing members, or other sealing means. Optionally, an outer lip 330 is formed on the shell 320 around the outer chamber 326, having a depth approximately equal to the thickness of the outer panel 360, to form a smooth and continuous transition without a noticeable seam between the back of the shell and the outer panel, to resist detachment of the outer seal and reduce the likelihood of leakage from the outer chamber 326. As described above with regard to the previous embodiment, the inner seal between the shell 320 and the inner panel 350 is shielded within the case, between the shell and the housed electronic device, to resist detachment of the inner seal and reduce the likelihood of leakage from the inner chamber 324.

As shown in FIGS. 13A and 13B, the chamber separation wall 322 optionally includes one or more obliquely angled flanges or flow-directing weirs 332 along its interior and/or exterior face(s) to direct the flow of the liquid component(s) contained one or both of the chambers 324, 326, for enhanced visual effect. In example embodiments, oppositely inclined offset pairs of flow-directing elements form one or more V-shaped channels within the chambers. Alternatively, angled flanges or flow-directing weirs may be provided along interior faces of the inner and/or outer panels 350, 360, and/or otherwise configured flow-directing features can be provided for varying visual effects.

First and second fill spouts or ports 380, 382 may be provided in fluid communication with the inner and outer chambers 324, 326, respectively, for delivering liquid display contents into the chambers. The fill spouts or ports may optionally be sealed shut by plugs or other sealing or closure means after filling to prevent liquid discharge. In example embodiments, the fill ports or spouts can be positioned adjacent the top, bottom or either side of the case, or alternatively can be formed through the inner and/or outer panels 350, 360.

In example embodiments, various different liquid materials fill each of the inner and outer chambers 324, 326 to produce interesting and entertaining visual display effects during use of the case 310. In example embodiments, each chamber 324, 326 contains an immiscible mixture of a dyed high-density solution and a dyed low-density solution of differing colors. The two carriers in each chamber are specially selected so that they are immiscible with each other. The two dyes in each chamber are also specially selected so that they are immiscible with each other but miscible with their respective carriers. The colors can be opaque, translucent or transparent. The overlaying of multiple colors due to the multiple chamber design gives the illusion of multiple colors in the cell phone case.

For example, the first or inner chamber 324 contains a first liquid component 390 and a second liquid component 392 that is immiscible with the first liquid component. The first liquid 390 component comprises a first carrier liquid and a first dye that is miscible with the first carrier liquid. The second liquid component 392 comprises a second carrier liquid and a second dye that is miscible with the second carrier liquid. The first carrier liquid is immiscible with the second carrier liquid, and the first dye is immiscible with the second dye. The first dye has a first color, and the second dye has a second color that is different than the first color. Similarly, the second or outer chamber 326 contains a third liquid component 394 and a fourth liquid component 396 that is immiscible with the third liquid component. The third liquid component 394 comprises a third carrier liquid and a third dye that is miscible with the third carrier liquid. The fourth liquid component 396 comprises a fourth carrier liquid and a fourth dye that is miscible with the fourth carrier liquid. The third carrier liquid is immiscible with the fourth carrier liquid, and the third dye is immiscible with the fourth dye. The third dye has a third color that is preferably different from the first and second colors, and the fourth dye has a fourth color that is preferably different than the first, second and third colors.

In a representative example: (1) the first liquid component 390 comprises a first carrier comprising a low density liquid such as mineral oil, silicone oil or other low density liquid, and a first dye such as an oil soluble dye of a first color, for example pink; (2) the second liquid component 392 comprises a second carrier comprising a high density liquid such as a water and propylene glycol solution, and a second dye such as a water soluble dye of a second (different) color, for example blue; (3) the third liquid component 394 comprises a third carrier comprising a low density liquid such as mineral oil, silicone oil or other low density liquid, and a third dye such as an oil soluble dye of a third (still different) color, for example green; and (4) the fourth liquid component 396 comprises a fourth carrier comprising a high density liquid such as a water and propylene glycol solution, and a fourth dye such as a water soluble dye of a fourth (and further still different) color, for example purple. Optionally, one or more solid components such as, for example, metallic or foil glitter, beads, shaped particles, decorative elements, or the like may be incorporated or mixed into one or more of the liquid components.

In use, inversion of movement of the case 310 causes flows and counterflows between the liquids contained in the chambers 324, 326, producing varied and constantly changing appearances with patterns and sections of multiple different colors, which are visible through the back of the case. When viewed by an observer from the back exterior side of the case, with or without the contained electronic device installed, the liquid contents of the outer chamber 326 overlie the liquid contents of the inner chamber 324, creating the appearance of different flow patterns and color combinations, with the contents of both the inner and outer chambers being visible through the back panel of the case through the transparent or translucent outer panel 360 and the transparent or translucent chamber separation wall 322. FIGS. 16A, 16B, 16C, 16D and 16E show various stages of liquid flow and liquid display. Optionally, the case further comprises one or more light sources configured to direct light into or onto the liquid-containing chambers of the case for enhanced visual effect.

Figure 17B:
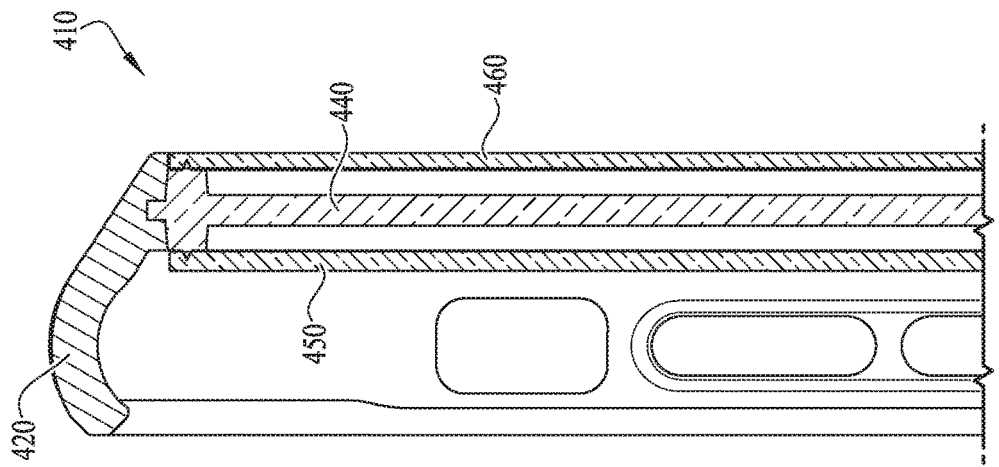
FIGS. 17A and 17B show a case or cover for a cell-phone or other electronic device according to an example embodiment of the invention.
Figure 17A:
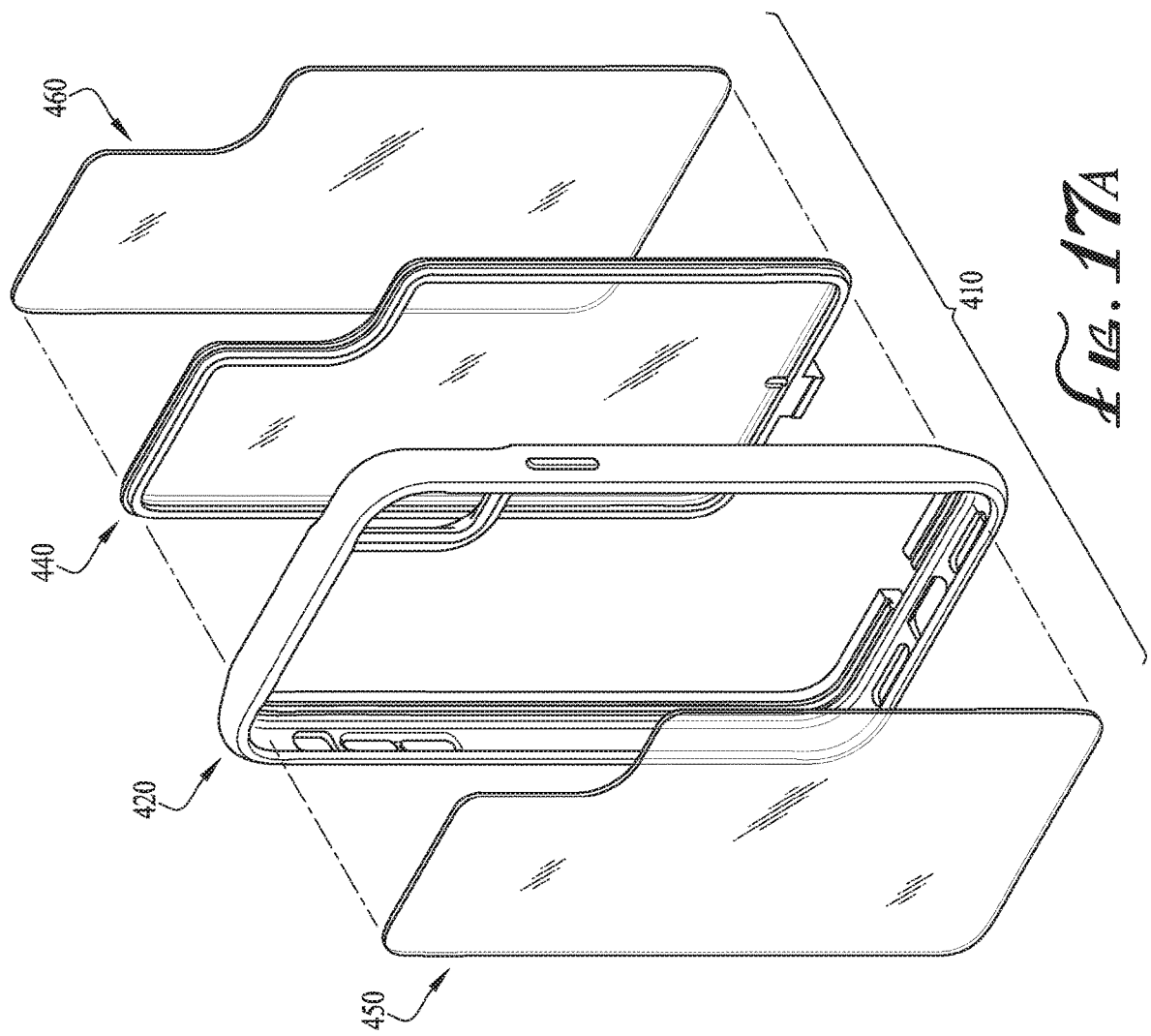
Figure 19B:
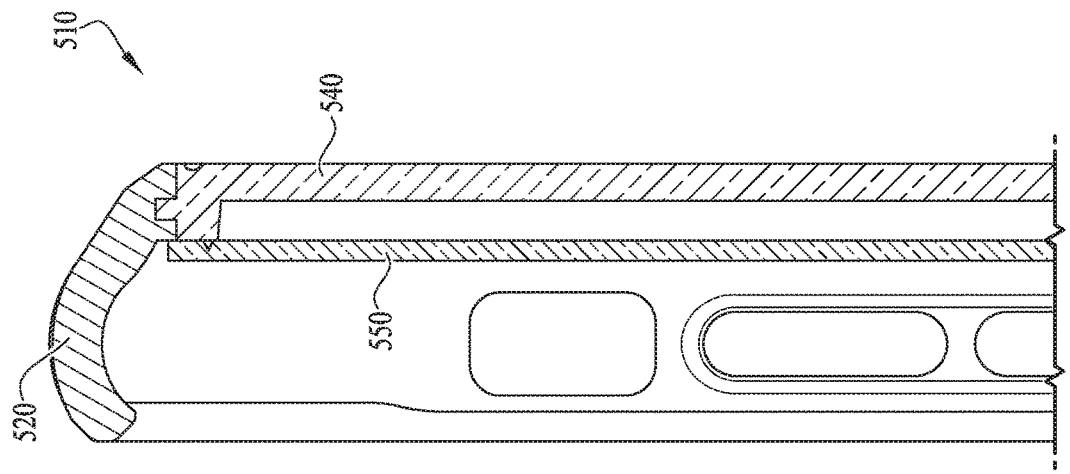
Figure 19A:
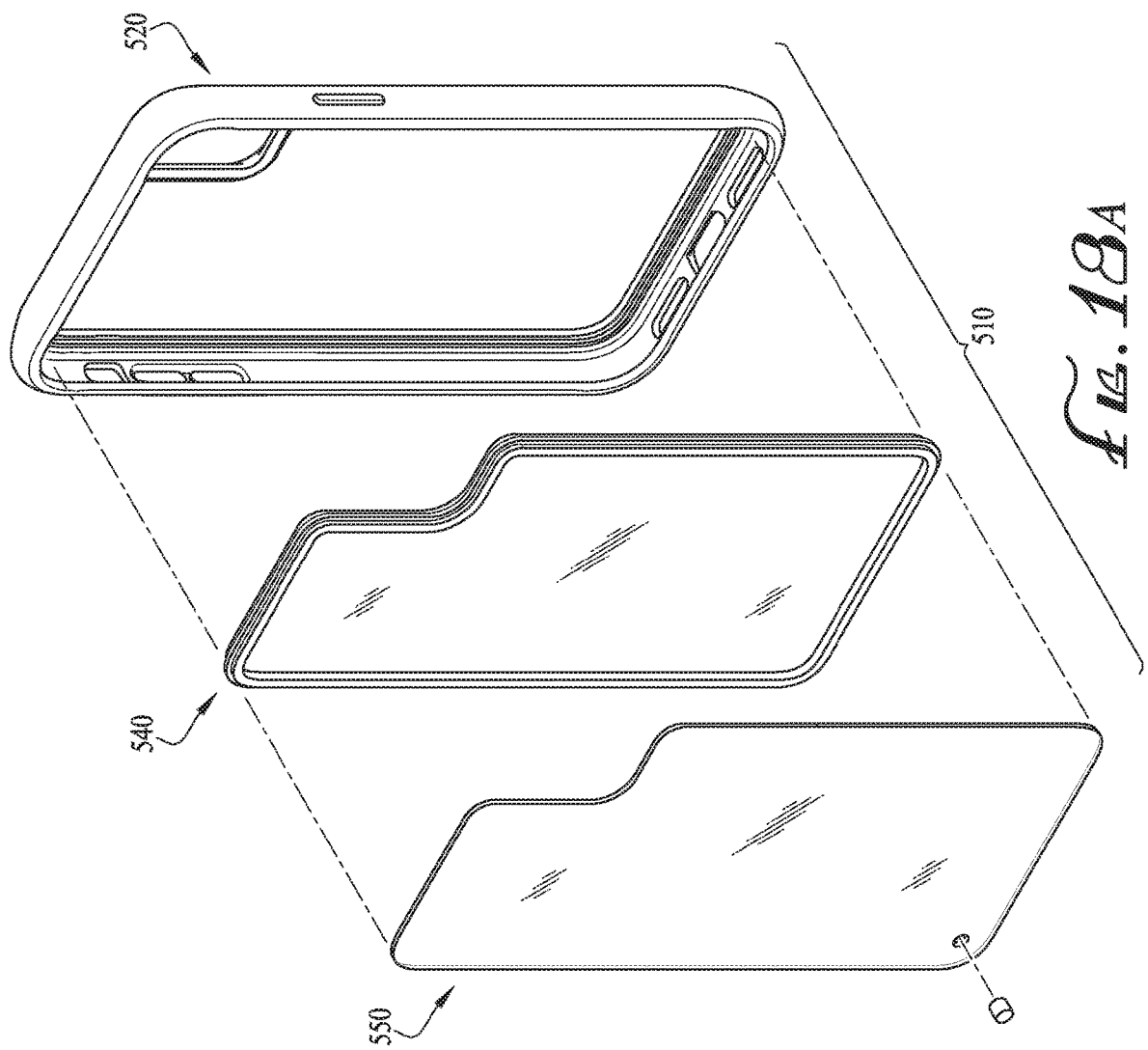

FIGS. 17A and 17B show a case or cover 410 for a cell phone or other electronic device according to another example embodiment of the invention. In this embodiment, the shell of the case comprises a single layer overmolded construction defining two chambers for containment of fluid contents in substantially similar fashion to those described above. An outer frame 420 formed of a thermoplastic polyurethane (TPU) or other impact-resistant soft or resilient plastic is overmolded onto a medial back insert panel 440 formed of polycarbonate (PC) or other impact-resistant hard plastic. An anterior or inner liquid display containment panel 450 is sealingly attached to a peripheral inner sealing face of the medial panel 440 to form a first or inner liquid containment chamber therebetween; and a posterior or outer liquid display containment panel 460 is sealingly attached to a peripheral outer sealing face of the medial panel 440 to form a second or outer liquid containment chamber therebetween. One or more liquid components are dispensed to at least partially fill the inner and outer liquid containment chambers in substantially similar fashion as described above. In example embodiments, the medial panel 440 and the outer containment panel 460 are at least partially, and optionally substantially entirely, transparent or translucent to allow visual observation of the fluid(s) contained in the inner and outer liquid containment chambers from the back side of the case 410. In example embodiments, the inner containment panel 450 is substantially opaque, for example white or other light color, for enhanced color contrast of the liquid contents of the inner and outer chambers; or alternatively may be transparent or translucent to allow visualization of the back of the housed electronic device through the case.

FIGS. 18A and 18B show a case or cover 510 for a cell phone or other electronic device according to another example embodiment of the invention. In this embodiment, the shell of the case comprises a single layer overmolded construction defining a single chamber for containment of fluid contents in substantially similar fashion as described above. An outer frame 520 formed of a thermoplastic polyurethane (TPU) or other impact-resistant soft or resilient plastic is overmolded onto a back insert panel 540 formed of polycarbonate (PC) or other impact-resistant hard plastic. An inner liquid display containment panel 550 is sealingly attached to a peripheral inner sealing face of the back panel 540 to form a liquid containment chamber therebetween. One or more liquid components are delivered to at least partially fill the liquid containment chamber in substantially similar fashion as described above. The back panel 540 is at least partially, and optionally substantially entirely, transparent or translucent to allow visual observation of the fluid(s) contained in the liquid containment chamber from the back side of the case 510. In example embodiments, the inner containment panel 550 is substantially opaque, for example white or other light color, for enhanced color contrast of the liquid contents of the liquid containment chamber; or alternatively may be transparent or translucent to allow visualization of the back of the housed electronic device through the case.

While the invention has been described with reference to example embodiments, it will be understood by those skilled in the art that a variety of modifications, additions and deletions are within the scope of the invention, as defined by the following claims.

What is claimed is:

1. A multi-chambered case for an electronic device, the case comprising at least two sealed chambers, each of the chambers being at least partially filled with at least one liquid component; wherein the case further comprises a shell comprising a transparent chamber separation wall forming a liquid impermeable barrier between the at least two sealed chambers, an inner recess on an inner side of the chamber separation wall and an outer recess on an opposite outer side of the chamber separation wall, an inner panel covering the inner recess to define a first of the at least two sealed chambers and a transparent outer panel covering the outer recess to define a second of the at least two sealed chambers, wherein the at least one liquid component in each of the at least two sealed chambers is visible through the outer panel and the chamber separation wall from external of the case.

2. The multi-chambered case of claim 1, wherein each of the sealed chambers contains a first liquid component and a second liquid component that is immiscible with the first liquid component.

3. The multi-chambered case of claim 2, wherein the first liquid component comprises a lower-density liquid carrier and a first dye having a first color, and wherein the second liquid component comprises a higher-density liquid carrier and a second dye having a second color different from the first color.

4. The multi-chambered case of claim 3, wherein the lower-density liquid carrier comprises an oil, and wherein the higher-density liquid carrier comprises water.

5. The multi-chambered case of claim 3, wherein the first and second dyes contained in a first of the at least two sealed chambers have different colors than the first and second dyes contained in a second of the at least two sealed chambers.

* * * * *